METHOD FOR MEASUREMENT OF THE SHAPE AND CURVATURE OF A CORNEA

Original Filed March 5, 1968 4 Sheets-Sheet 1

INVENTOR.
DAVID VOLK
BY
Baldwin, Egan, Walling & Fetzer
ATTORNEYS

METHOD FOR MEASUREMENT OF THE SHAPE AND CURVATURE OF A CORNEA

Original Filed March 5, 1968 4 Sheets-Sheet 2

INVENTOR.
DAVID VOLK
BY
Baldwin, Egan, Walling & Fetzer
ATTORNEYS

METHOD FOR MEASUREMENT OF THE SHAPE AND CURVATURE OF A CORNEA

Original Filed March 5, 1968 4 Sheets-Sheet 3

INVENTOR.
DAVID VOLK
BY
Baldwin, Egan, Walling & Fetzer
ATTORNEYS

METHOD FOR MEASUREMENT OF THE SHAPE AND CURVATURE OF A CORNEA
Original Filed March 5, 1968 4 Sheets-Sheet 4
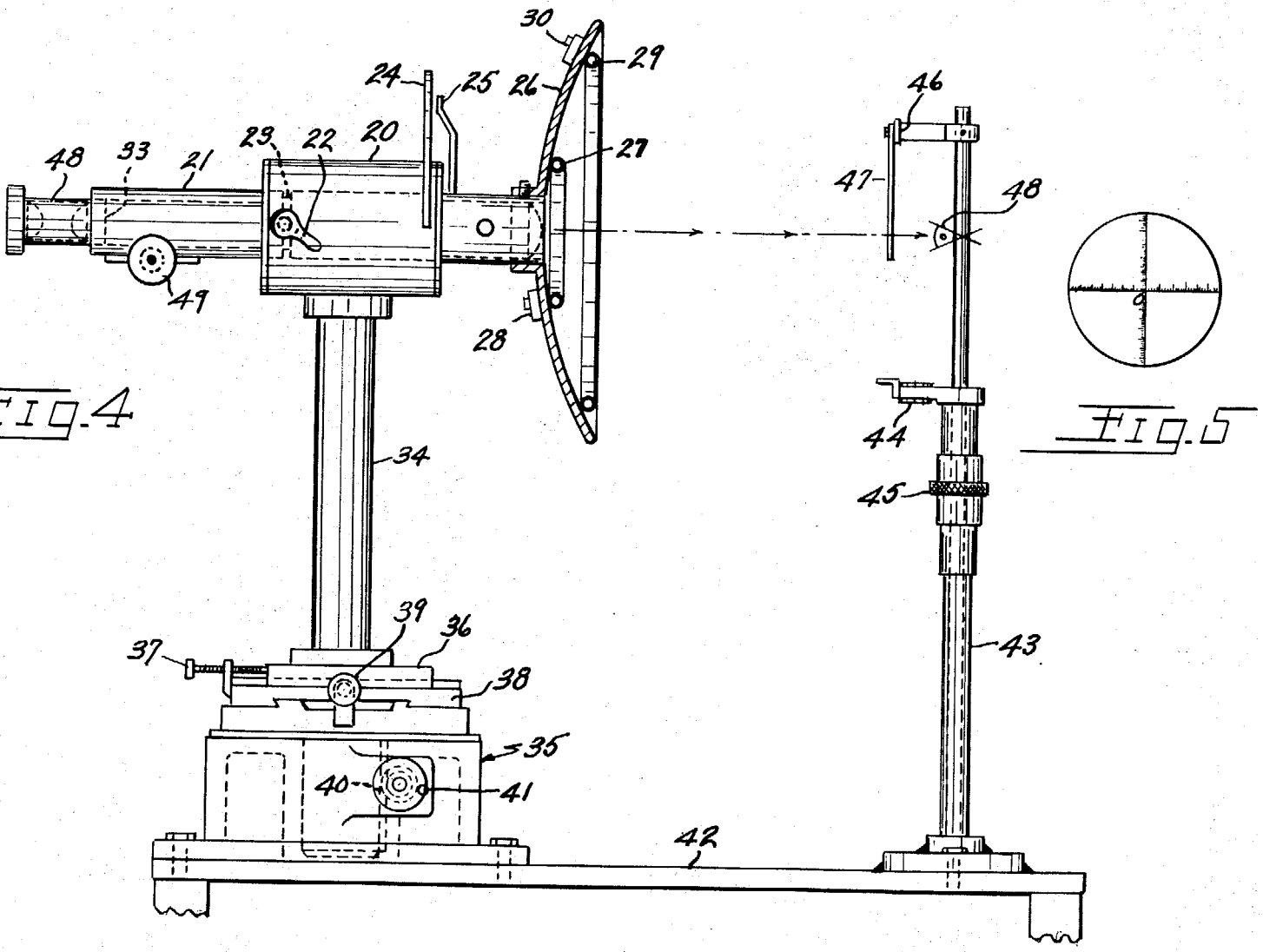
INVENTOR.
DAVID VOLK
BY
Baldwin, Egan, Walling & Fetzer
ATTORNEYS United States Patent Office Re. 27,475
Reissued Sept. 5, 1972

27,475

METHOD FOR MEASUREMENT OF THE SHAPE AND CURVATURE OF A CORNEA

David Volk, 2460 Fairmount Blvd.,
Cleveland, Ohio 44106

Original No. 3,542,458, dated Nov. 24, 1970, Ser. No. 710,557, Mar. 5, 1968. Application for reissue Feb. 8, 1971, Ser. No. 113,775
Int. Cl. A61b *3/00, 3/10*
U.S. Cl. 351—39 1 Claim

Matter enclosed in heavy brackets [ ] appears in the original patent but forms no part of this reissue specification; matter printed in italics indicates the additions made by reissue.

ABSTRACT OF THE DISCLOSURE

A method and apparatus are provided for measuring the apical radius of curvature and eccentricity of a conicoid surface, such as a cornea or lens, by supporting larger and smaller circular targets concentric to the optical axis of a telescope which has its optical axis aligned with the optical axis of the conicoid surface. The telescope is focused on the reflected image of the smaller target which is measured to determine the apical radius of curvature of the conicoid surface. The telescope is then focused on the reflected image of the larger target which is measured, and its size and the determined apical radius of curvature are used to determine the eccentricity of the conicoid surface.

Figure 1:
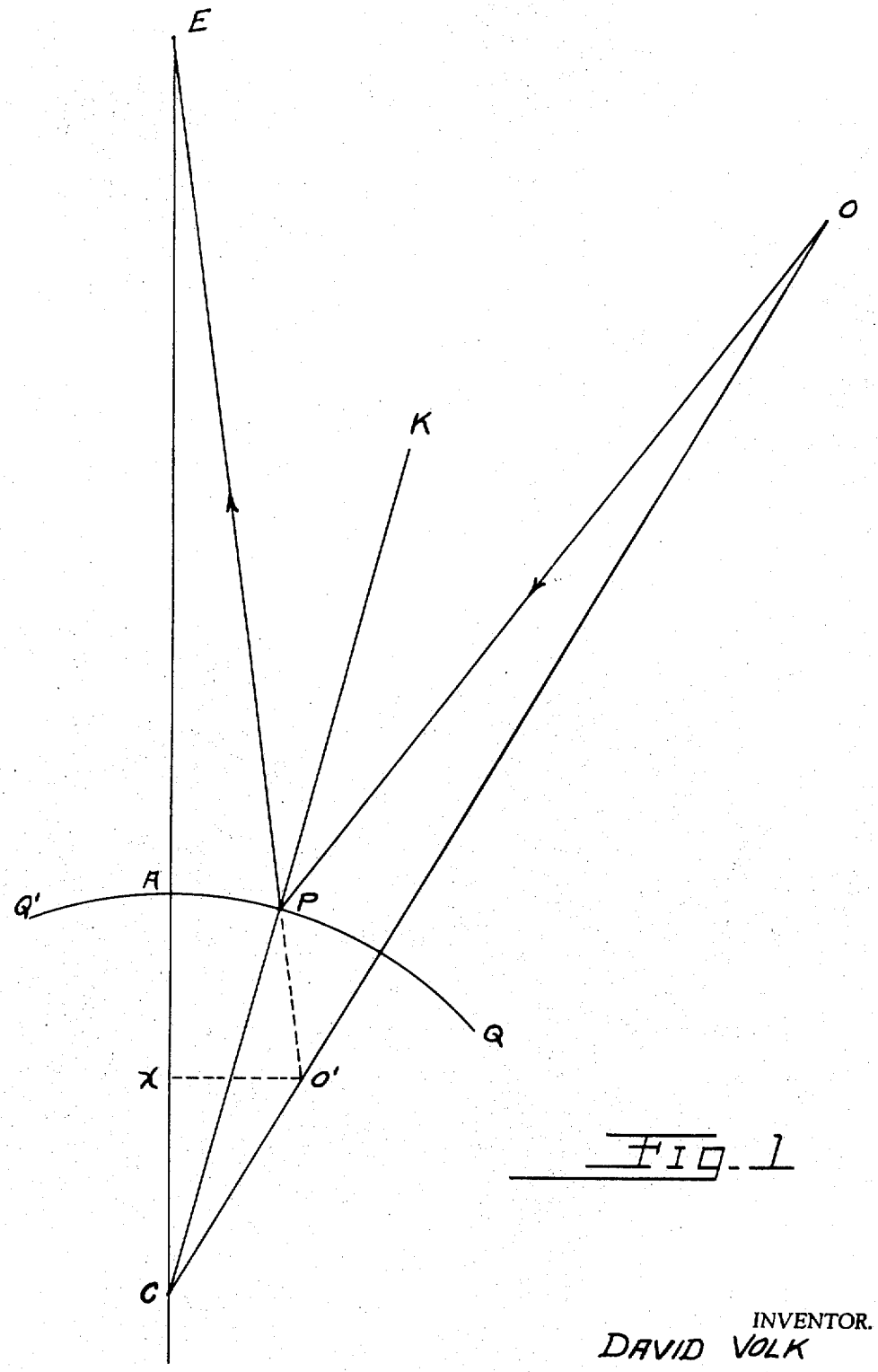

This invention relates to a method and apparatus for determining simultaneously the apical radius of curvature of the cornea and the shape of the cornea in terms of the eccentricity of conicoids of revolution which approximate the shape of the cornea. The same method and apparatus can be used for the determination of apical radius of curvature and eccentricity of conicoids of revolution used for both the anterior and posterior surfaces of contact lenses. The method and apparatus is also applicable to similar determinations on the much larger conicoids of revolution used for spectacle lenses and for molds for the casting of such lenses.

Figure 2:
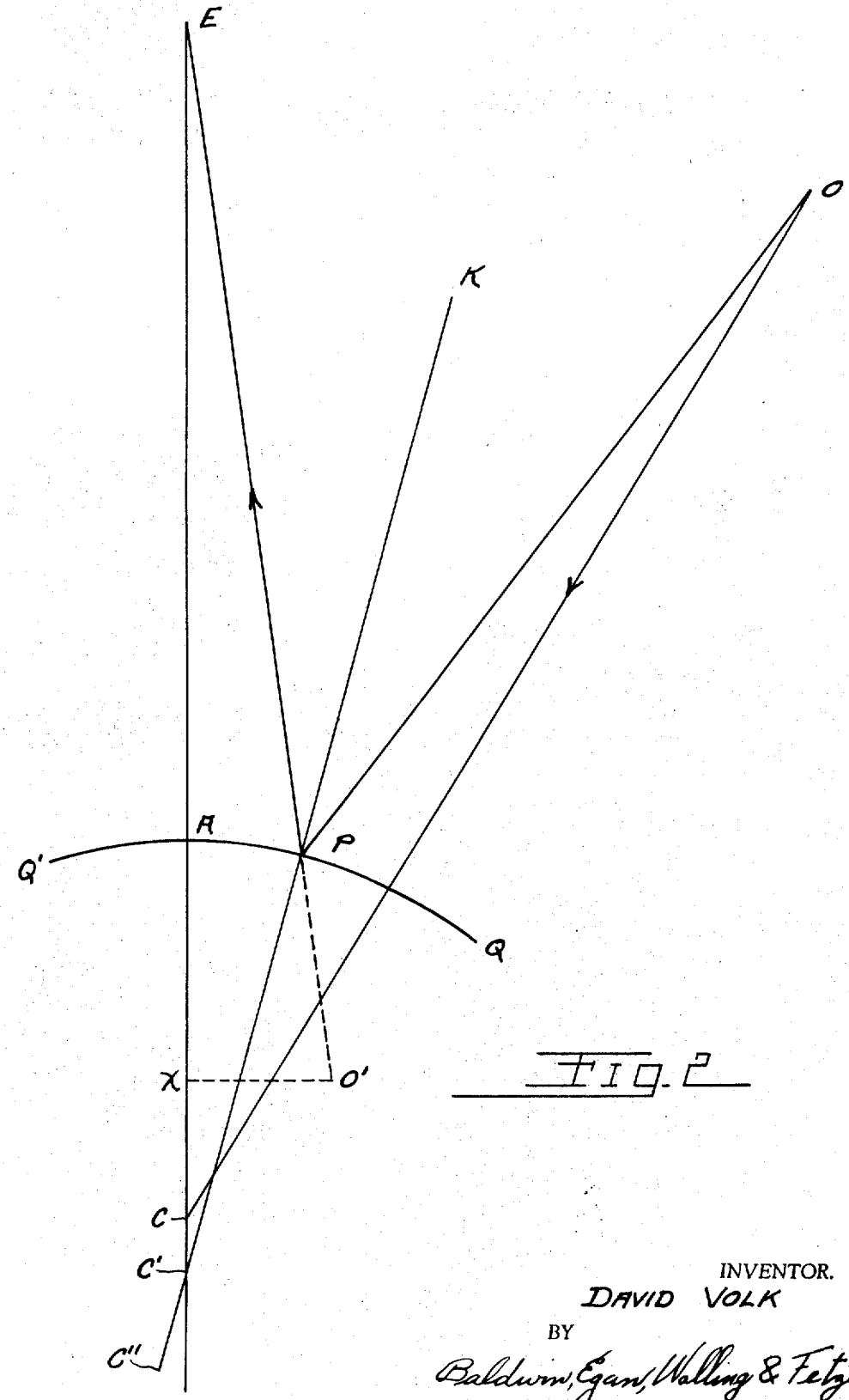
Figure 3:
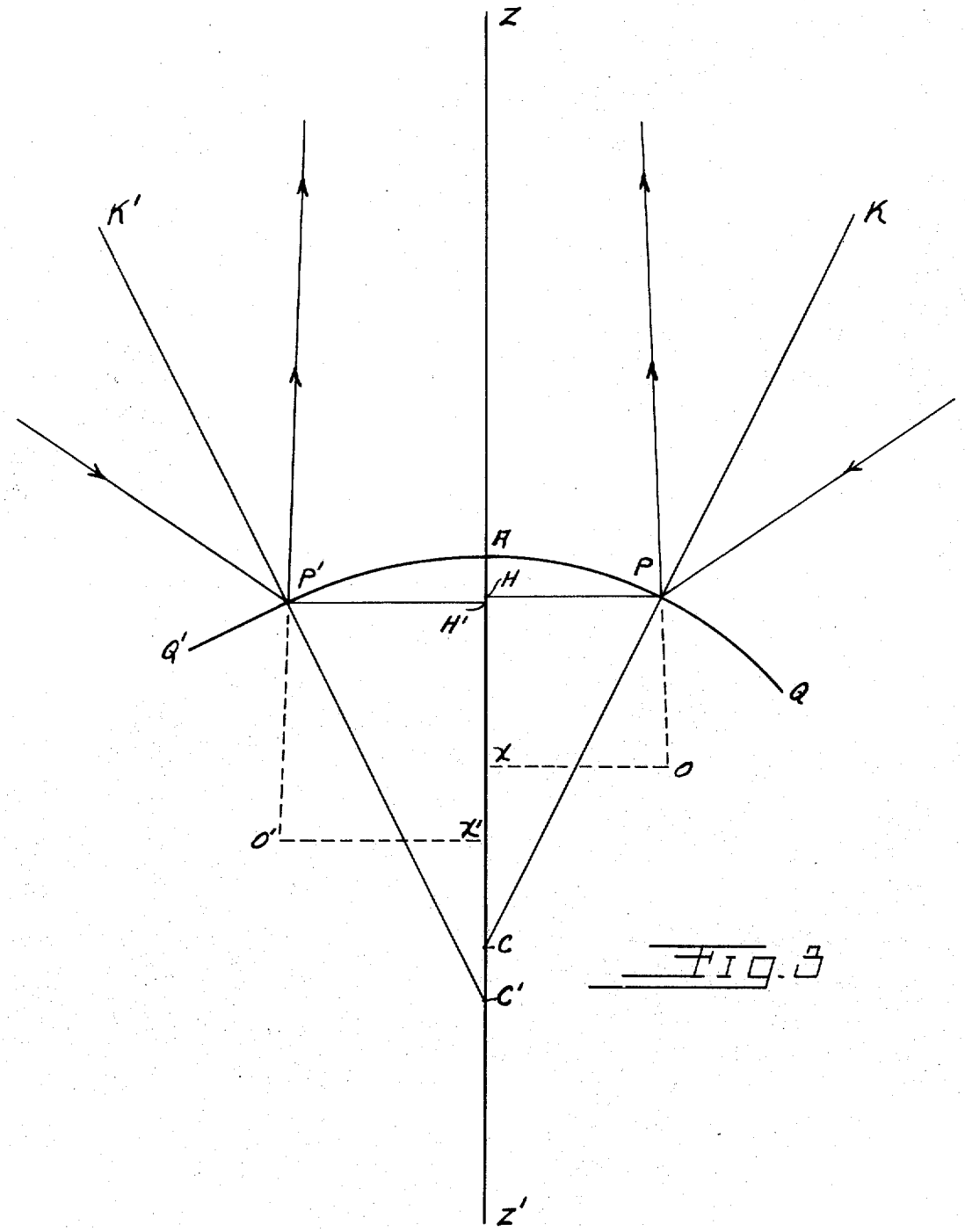

In the drawings:

FIG. 1, not drawn to scale, is a diagrammatic representation of the positions of points, surfaces and chief rays involved in image formation by reflection from a spherical surface of an off-axis object point;

FIG. 2, not drawn to scale, is a diagrammatic representation of the positions of points, surfaces and chief rays involved in image formation by reflection from a conicoid of revolution of an off-axis point;

FIG. 3, drawn to scale, is a diagram comparing the spherical image of FIG. 1, to the right of the central axis, with the conicoid or paraboloid image of FIG. 2, to the left of the central axis;

FIG. 4 is a side elevational view, partly in section, of apparatus suitable for carrying out the method of this invention; while FIG. 5 is an enlarged view of reticle 33 with usual cross lines.

When the cornea is not a surface of revolution but has two principal meridians, the same method and apparatus can be used for the determination of the apical radius of curvature and eccentricity in each of the principal meridians. Hereafter the description will apply to the cornea in terms of conicoids of revolution and I will speak of the apical radius of curvature and eccentricity of the cornea. It is to be understood that when the cornea has principal meridians, each principal meridian can be considered in terms of the apical radius of curvature and eccentricity of the approximating conic section.

It is known that the anterior surface of the cornea is most highly curved at its apex, and from said apex to the periphery it decreases continuously and regularly in curvature, resembling prolate ellipsoids, paraboloids, or hyperboloids. The rate of decrease in meridional and transmeridional curvatures for corneas of a given apical radius of curvature varies from cornea to cornea, depending upon the eccentricity of the cornea.

When the corneal surface is used as a mirror, the size of the corneal image of a relatively large target of a given size and for a given object distance will vary according to the two variables which define a conicoid of revolution: apical radius of curvature and eccentricity.

For corneas of a given apical radius of curvature, the size of the image of a given size target centered about a common optical axis of the cornea and of the telescope, perpendicular to the optical axis of the telescope and at a given distance from the apex of the cornea, said image observed through the telescope from a point along the axis of the cornea, will increase as the eccentricity of the cornea increases. Thus a basis is established for determining the eccentricity of a given cornea in terms of the size of the corneal image of a given target.

When the apical radius of curvature of the cornea is determined by ophthalmometry, the target is relatively small, so that the portions of the cornea involved in the formation of the observed corneal image are quite close to the apex of the cornea. When this is the case, the radius of curvature determined is substantially independent of the eccentricity of the cornea, since the rates of change in curvature about the apex of a cornea or conicoid are so small that the radius of curvature determined with a relatively small ophthalmometer target is substantially that of the spherical surface which osculates the cornea or conicoid at its apex.

However, when a relatively large target is used, the portions of the cornea involved in the formation of the observed corneal image are at relatively great distances from the corneal apex. For corneas of a given apical radius of curvature but differing eccentricities, and a given relatively large size target at a given target distance, the greater the eccentricity, the more distant from the corneal apex are the portions of the cornea involved in the formation of the observed corneal image, and the larger is the observed corneal image.

Hence in the method of this invention, it is first necessary to determine the radius of curvature of the corneal apex to establish the magnitude of the surface measured, as distinguished from its eccentricity. This is achieved by ophthalmometry, using a small target on the ophthalmometer, measuring the size of the corneal image of the target and applying the mirror equations for paraxial conditions, to the data obtained. These equations are: (1) the object size-image size ratio equation.

$$y'/y=u'/u \qquad (1)$$

where $y'$ is the size of the image, $y$ is the size of the target, $u$ is the object distance, and $u'$ is the image distance. $y'$, the image size, is measured with the opthalmometer, and said size is applied to the above equation to determine the image distance $u'$. Once the image distance is determined, it is applied to the second mirror equation (2) relating the conjugate foci and the radius of curvature of the mirror surface:

$$1/u+1/u'=2/r \qquad (2)$$

to determine the apical radius of curvature, r, of the core cornea.

Having determined the apical radius of curvature of the cornea, the method and apparatus are then used to produce a relatively large corneal image of a relatively large target of a given size, the object and image being symmetrical with respect to the common optical axis of the cornea and telescope of the ophthalmometer, and to measure the size of said corneal image. The image, for a cornea of a given apical radius of curvature, varies in size as a function of the eccentricity of the cornea, so that measured image size can be used to indicate the eccentricity of the cornea. The techniques for measurement of the size of the corneal images are well known in the art of corneal measurement and need not be described herein. These involve the method of doubling the image, or the direct measurement of the size of the image by means of a calibrated reticle in the eyepiece of the telescope of the ophthalmometer, or the telescope image may be matched in size by a superimposed image of adjustable size, the size of the superimposed image indicating the size of the corneal image.

Conventional ophthalmometry utilizes a relatively small target, and the paraxial mirror equations (1) and (2) are applicable. However, if a large target is used on the ophthalmometer, the mirror equations must be modified to take into account the significant obliquity of the incident and reflected light rays with respect to the corneal surface. Furthermore, the peripheral corneal surface is astigmatic, having meridional and transmeridional principal directions and principal curvatures which vary along a meridian. The observed image of a peripheral target point will be astigmatic with the focal lines being meridional and transmeridional in direction. If a circle centered about the common optical axis of the cornea and telescope is used as the target, or if a series of point objects arrayed closely on said circle is the target, overlapping of the transmeridional focal lines of all points on said circle produces a sharp circular image whose size can be measured.

The modified mirror equation for said circular image, for non paraxial conditions, where the angle of incidence is oblique with respect to the reflecting surface is:

$$1/u+1/u'_{(mer)}=2/r_{(mer)} \cos i \qquad (3)$$

where i is the angle of incidence of the chief ray from a point on said circular target with respect to the reflecting surface, $u'_{(mer)}$ is the image distance of the transmeridional focal line, projected back along the reflected chief ray, from the point of reflection of said ray, and $r_{(mer)}$ is the meridional radius of curvature at said point of reflection. It should be understood that the image distance of said transmeridional focal line, $u'_{(mer)}$, is a function of the meridional curvature and said angle of incidence i at said point of reflection.

In order to demonstrate the effects of eccentricity upon the peripheral image size, and thereby demonstrate the method and apparatus of this invention, two examples will be used: (1) image formation and size of said image of a given relatively large circular target at a given object distance from a spherical reflecting surface of given radius of curvature (FIG. 1), and (2) image formation and size of said image of the same target and target distance from a paraboloidal reflecting surface having an apical radius of curvature equal to that of the sphere (FIG. 2).

FIG. 1, not drawn to scale, is used to represent the positions of points, surfaces and chief rays involved in image formation by reflection from a spherical surface of an off-axis object point. Point O is the object point, OP is the incident chief ray, and PE is the reflected chief ray, with point E being the center of the entrance pupil of the telescope. Line CE is the common optical axis of the telescope and the spherical reflecting surface Q'AQ, whose center of curvature is point C. Line CK is the normal to the reflecting surface at point P, so that angles OPK and KPE are equal, and each equal to angle i previously mentioned. Angle OCE is 53.416° while angles OPK and KPE are each 28.073°. OC=CE=158 mm., while CA=CP=8 mm. From the geometry of FIG. 1, and using Equation 3, image distance PO', seen in the direction EP, is calculated to be 3.448 mm., while image size XO' is calculated to be 3.678 mm. Using two object points symmetrically placed with respect to optical axis CE, the image size is then 7.356 mm. In this example, point P is 3.594 mm. from the optical axis.

FIG. 2, not drawn to scale, is used to represent the positions of points, surfaces and chief rays involved in image formation by reflection from a conicoid of revolution of an off-axis object point. Point O is the object point, OP is the incident chief ray and PE is the reflected chief ray, with point E being the center of the entrance pupil of the telescope. Line CE is the common optical axis of the telescope and the conicoid reflecting surface Q'AQ, which in this example is a paraboloid. CA is the apical radius of curvature of the surface and is 8 mm. Line C'K is the normal to the surface at point P, the medidional radius of curvature C''P at point P being 11.18 mm., while C'P the transmeridional radius of curvature at point P is 8.944 mm. Angle OCE is 53.416° while angles OPK and KPE are each 28.082°. In this example, point P is 4 mm. from the optical axis. Distance CE=1.58 mm. while C'E=1.59 mm. From the geometry of FIG. 2, and using Equation 3, image distance PO', seen in the direction EP, is calculated to be 4.775 mm. Image size XO' is calculated to be 4.13 mm. Using two object points symmetrically placed with respect to the optical axis CE, the image size is then 8.26 mm.

FIG. 3, drawn to exact scale, is used as a means of comparison of image sizes and positions for the two images of FIGS. 1 and 2. Line ZZ' represents the combined optical axes of each of the two mirror surfaces, the spherical half mirror AQ being to the right of ZZ', and the paraboloidal half mirror AQ' being to the left of ZZ'. AX is the vertex depth and XO is the semidiameter of the image produced by the spherical mirror, while AX' is the vertex depth and X'O' is the semidiameter of the image produced by the paraboloidal mirror. HP and H'P' represent the distances of the points of reflection of the chief rays from the optical axes on the spherical and the paraboloidal mirrors respectively.

FIGS. 1, 2 and 3 demonstrate the marked difference in image size for the two surfaces having the same apical radius of curvature, 8 mm., but different eccentricities, namely, 0 and 1, for the given large fixed size object at the given object distance from the apex of the reflecting surface. These size differences are readily measured by ophthalmometry, FIGS. 1, 2 and 3 further demonstrate that on the reflecting surface of the greater eccentricity, the point of reflection of the chief ray from the object point to the center of the entrance pupil of the telescope, is farther from the common optical axis of the reflecting surface and the telescope. It is apparent that as the eccentricities of reflecting surfaces of a given apical radius of curvature increase, the image size of a relatively large object will also increase. Thus, for a series of conicoids of a given apical radius of curvature but of different eccentricities, there will be a series of related image sizes for a given relatively large target size, each image size corresponding to a particular eccentricity.

In this invention, there are two separate and distinct targets on the apparatus: (1) a relatively small circular target of given diameter, concentric to the telescope optical axis in a given object plane, said small target producing a small image by reflection, which image is used for the determination of the apical radius of curvature of the reflecting surface, all being considered to be under substantially paraxial conditions, and (2) a relatively large circular target of fixed diameter, also concentric to the telescope optical axis, and in a second object plane, object points in said two circular targets and the center of the entrance pupil of the telescope all being at substantially equal distances from a common point along said telescope optical axis. Said relatively large circular target produces a relatively large image by reflection, whose size, when used in conjunction with the determined apical radius of curvature of the reflecting surface, is used for the determination of the eccentricity of the reflecting surface, said second target, the reflecting surface, the target image, and the telescopic observation of said image, all being under nonparaxial conditions.

Although I have just stated that the targets are circles, they may actually consist of a series of very small spots, small points of light for example, closely arrayed in a circular pattern, as previously stated. Sharp focusing of the telescope upon the image produced by reflection is facilitated when the target consists of the small spots of light. Further, with the use of said spots, the principal directions of the apex of the cornea can be readily determined when there is apical astigmatism, by the directions of the focal lines of each spot, as the telescope of the ophthalmometer is alternately focused upon each of the two sets of overlapping transmeridional focal lines, or upon each of the two sets of parallel meridional focal lines, while at the same time measuring the size of the transmeridional image as indicated by the sharply focused overlapping transmeridional lines for each of the principal directions. Similarly, with the large target composed of the series of light spots arrayed in the circular pattern, each of the two principal meridians and the size of the transmeridional image in each of said meridians can be readily determined.

Since, for a cornea of a given apical radius of curvature, the measured image size of said relatively large target is a function of the eccentricity of said cornea, it is necessary that the apical radius of curvature and the size of the relatively large image of the given target be used in conjunction with each other for the determination of the eccentricity of said cornea. For example, one may tabulate a series of corneal apical radii of curvature, and then for each of said radii, there may be listed a series of image sizes for said relatively large target, each successively larger image size indicating a greater eccentricity of said cornea having said apical radius of curvature. By reference to such a table, the two measurements of a cornea with the two said targets is sufficient for the determination of both the apical radius of curvature and the eccentricity of said cornea. Instead of tabulating the data as just described, it may be presented graphically. It is to be understood that the dimensions of the apparatus, target size and target distance in particular, will affect the size of the corneal image, and this is taken into account when constructing the apparatus.

In the examples given previously demonstrating the principles of this invention, which examples utilized FIGS. 1, 2 and 3, the actual values of target size and target distance for the larger of the two targets is a good example of the dimensions which are very adequate for carrying out this invention. Distances outward from the axis of the cornea, for the points of reflection of the chief rays from target points, points P of FIGS. 1 and 2, should be relatively large, from 3 to 5 mm. These relatively large distances makes possible significant differences in image size for significant differences in eccentricities for corneas of given specific apical radii of curvature. It should be understood that constructing the apparatus with somewhat different dimensions will only alter the range of image sizes for said larger target without departing from the basic method and apparatus of this invention. Regardless of the specific dimensions which are used on the apparatus, the size of images produced by a reflection of given size target at a given distance from the corneal apex of corneas having different apical radii of curvature and different eccentricities, can be readily computed, utilizing mirror equations, the law of reflection, and the geometry of conic sections, thus providing the data necessary for suitable tables or graphs.

A sample calculation showing the sequence of steps in the calculation of image size for a given relatively large target will be presented. Such calculation may be programmed for an electronic computer to obtain the data for the tables or graphs previously referred to.

The sample calculation will be that for the surface illustrated in section in FIG. 2, a paraboloid having an apical radius of curvature $r_{apex}=CA$, of 8 mm. Point P on the surface, 4 mm. from the optical axis of said surface, has been selected as an appropriate distance laterally at which a chief ray from a target point O will be reflected to the center of the entrance pupil E of the telescope.

The equation for a conicoid of revolution, including prolate ellipsoids, paraboloids, and hyperboloids of two sheets, which relate apical radius of curvature $r_{apex}$, eccentricity, e, vertex depth, x, as measured along the axis of said conicoid from its apex, and the distance, y, from said axis, of a point P(x,y) on said surface is:

$$(1-e^2)x^2-2r_{apex}x+y^2=0 \qquad (4)$$

Equation (4) may be solved by means of the quadratic formula, for values of x, for given values of e, $r_{apex}$, and y.

For the given example, where e=1, $r_{apex}$=8 mm., and y=4 mm., the vertex depth x of point P(x,y) is calculated by means of Equation (4) to be 1 mm.

A normal through point P(1,4), intersects the axis of the surface at C′, at a distance from its apex equal to $r_{apex}+xe^2$, where $xe^2=CC'$, so that C′ is 9 mm. from said apex. The angle $\gamma$ which said normal makes with the axis of the surface at C′ is obtained by the following formula:

$$\gamma=\tan^{-1}\left(\frac{y}{r_{apex}+(e^2-1)x}\right) \qquad (5)$$

and is calculated to be 26.565°. The distance C′P is the transmeridional radius of curvature $r_{trans.}$ of the surface at point P(1,4) and is calculated by means of the following formula:

$$r_{trans}=\frac{y}{\sin\gamma} \qquad (6)$$

and for the example given is 8.944 mm.

The meridional radius of curvature at point P, $r_{mer}=C''P$, can be obtained from the values of $r_{trans.}$ $\gamma$, and e, by means of the following equation:

$$r_{mer}=\frac{r_{trans}}{(1-e^2\sin^2\gamma)} \qquad (7)$$

and $r_{mer}$ is calculated to be 11.180 mm.

The distance AE from the apex of the surface to the center of the entrance pupil of the telescope is 150 mm. The reflected chief ray PE forms an angle $\alpha$ with the common optical axis CE of the conicoid surface and telescope, where $$\alpha=\tan^{-1}\frac{y}{150+x} \qquad (8)$$

and $\alpha$ is calculated to be 1.517°. The distance PE=y/sin$\alpha$ and is calculated to be 151.053 mm.

Angle i′, the angle of reflection of the chief ray PE is equal to the sum of angles $\alpha$ and $\gamma$, and is 28.082°. By the law of reflection, angle i, the angle of incidence of the chief ray from the object point O to point P on the surface, must also be 28.082°.

To obtain sufficiently large numerical values, the object point O was so selected that it lay in a plane perpendicular to the optical axis of the telescope, said plane being at a distance of 86.168 mm. from the apex of the reflecting surface, with the object point O at a distance of 126.871 mm. lateral to the common optical axes of the telescope and the reflecting surface.

By means of Pythagorean Theorum, and using the coordinates of points P and O, object distance OP=u is computed to be 150.650 mm.

Using object distance u=150.650, $r_{mer}$=11.180 mm., and i=28.082°, and applying these values to Equation (3), u′=PO′ is calculated to be 4.775 mm.

The distance of point O′ from the optical axis of the reflecting surface, which is the image size XO′, is calculated to be equal to EO′ sin α, and is 4.13 mm. Assuming a second object point at the same distance on the opposite side of the optical axis, thereby representing two points out of a concentric circular target, the total image size would 8.26 mm.

The essential feature characteristic of the above calculation is the compliance with the law of reflection wherein i=i′. Hence for any given large size target in a plane perpendicular to the common conicoid telescope optical axis at a given distance from the apex of the conicoid reflecting surface, having a given apical radius of curvature and eccentricity, the correct calculation of image size must show that i and i′ are equal. If independently calculated values of i and i′ are unequal, this indicates an error has been made.

Suitable apparatus for carrying out this invention is indicated in FIG. 4. A fixed housing 20 has a cylindrical bore snugly fit to the telescope 21 passing through the bore. The telescope is capable of rotation about its optical axis to any predetermined angular position where it is locked in position at 22. Telescope 21 is prevented from longitudinal movement within the bore of housing 20 by means of a pin at the end of clamp 22 which fits into a groove 23 of the telescope. A reticle 33 is fitted in eyepiece 48 and the reticle has two lines crossing at 90° and calibrated so as to read image sizes as will later be described. The angular position of the telescope about its axis and the position of the reticle 33 can be read on scale 24, fixed to housing 20, by means of pointer 25 which is fixed to the telescope. One may thus adjust the reticle lines vertical and horizontal or, in the case of astigmatism, at other angles corresponding to the principal meridians, as later described. Fixed to the front end of the telescope is a bracket 26 which carries a smaller circular target 27 in the form of a circular fluorescent tube which is served by a transformer and ballast indicated at 28 and which operates in the usual manner. A second larger circular target 29 is also mounted on bracket 26 and is in the form shown here of a circular fluorescent tube served by the usual transformer and ballast 30. The targets 27 and 29 are concentric about the optical axis of the telescope 21.

Housing 20 is rigidly mounted by post 34 to the base 35 and is capable of motion in three directions, one vertical and two horizontal. One of the horizontal motions is in a direction parallel to the axis of the telescope and involves slides 36 slidable on ways carried by cross slide 38. The slide adjustment at 36 is controlled by knob 37. The second horizontal motion is in a direction perpendicular to the telescope axis and involves slide 38 mounted on base 35 and controlled by screw 39. The vertical motion involves a worm and screw arrangement 40 controlled by knob 41.

The telescopic apparatus is mounted on a table 42 which also carries a pedestal 43 upon which is adjustably mounted a chin rest 44 adjustable by means shown at 45. A forehead rest 46 is supported on pedestal 43 above the chin rest 44. From the head rest extends an occluder 47 which can be oscillated in front of either eye. The position of the patient's eye is indicated at 48 and it should be understood that if a lens is being examined it is suitably supported in the position 48.

Using the dimensions of FIGS. 1 and 2, the telescope is so focused that when the object plane is about 154 mm. from the telescope objective lens, the image plane is at the reticle of the telescope eyepiece when said eyepiece is set at the zero position. For a cornea having an apical radius of curvature of about 8 mm., the small circular target and said telescope objective lens will be at about 150 mm. from the apex of the cornea and the corneal image of said target will be virtual and about 4 mm. behind the corneal apex.

In the performance of ophthalmometry for the determination of the apical radius of curvature of the cornea, the telescope is sharply focused upon the corneal image by moving said telescope toward or away from said image. Hence the object distance varies slightly as a function of the apical radius of curvature of the cornea since the small circular target is fixed to the telescope. Once the object distance has been fixed by focusing the telescope upon the image of said small circular target, the object distance for the large circular target is likewise fixed. Sharp focusing of the telescope upon said corneal image is then accomplished by means of adjustment of the telescope eyepiece. This is a preferred method of focusing upon said corneal image.

There will now be outlined in a series of steps the procedure for determining the apical radius of curvature and eccentricity of a cornea by the method and apparatus of this invention.

1. The patient is seated at the apparatus of FIG. 4 with the head level and held firmly in position by means of head rest 46 and chin rest 44, the height of the chin rest being adjusted to bring the level of the eyes approximately the same height as the optical axis of telescope 21.

2. Occluder 47 is adjusted to obstruct vision of the left eye.

3. The patient is asked to direct his gaze to the center of the telescope tube which he faces.

4. Telescope eyepiece 48 is set at zero position by knob 49 and the telescope is rotated about its optical axis setting pointer 25 at zero on scale 24, which positions the cross lines of reticle 33 horizontal and vertical respectively.

5. Small circular target 27 is illuminated, and by means of adjusting screws 37, 39 and 41, the corneal image of target 27 is sharply focused and centered about the crosshairs of the reticle 33 as seen through the telescope eyepiece 48.

6. The size of said circular image is measured directly on the reticle and said measurement is used in association with a table to indicate the apical radius of curvature of the cornea.

7. Illumination of the small circular target is discontinued and the large circular target 29 is then illuminated. By means of knob 49 telescope eyepiece 48 is adjusted until the corneal image of said target as seen through the telescope is sharply focused on the reticle at 48 and its size is measured on reticle 33. Reference is then made to the graphs or tables which relate apical radius of curvature of the cornea and image size of the large circular target, thereby obtaining the eccentricity of the cornea measured.

8. When the cornea is astigmatic at its apex, the procedure as outlined in the seven previous steps is performed for each of the two principal meridians of the cornea.

9. The occluder 47 is then adjusted to obstruct vision of the right eye, and steps (1) through (b)8 repeated.

The line of sight of the eye is generally directed about 5° nasal to the axis of the cornea, intersecting the cornea about .5 mm. nasal to the apex of the cornea. Consequently the image of the target, though centered about the optical axis of the telescope, may not be centered with respect to the optical axis of the cornea. If more precise results are desired, the angular separation of the line of sight of the eye and the optical axis of the cornea may be determined, by methods known in the art, and this angle taken into account when measuring the cornea. For this purpose I provide a supplementary fixation target (not shown) which can be moved with respect to the optical axis of the telescope, and thereby cause the corneal axis and the optical axis of the telescope to approximately coincide.

The major advantage of this invention, method and apparatus, for determining the two parameters, apical radius of curvature and eccentricity, which fully describe a conicoid of revolution, including the cornea which can be related to a conicoid, is that the previously known procedure requiring relative rotation of the measured surface is done away with. Instead, the present invention requires only a single alinement of the cornea, or conicoid, and the optical axis of the instrument; thereafter requiring only clear focusing of the image to measure the apical radius of curvature and eccentricity of the cornea, and possibly telescope adjustment for measurement in one or more principal meridians. Furthermore, the measurements which are made for any given meridian involve both halves of the cornea simultaneously, since the image of said targets is substantially symmetrical about the corneal axis, either in the case where the cornea is substantially a surface of revolution, or in the case where the cornea is not a surface of revolution, but instead has two principal meridians. Further, in those instances of corneal asymmetry, the simultaneous involvement of opposite halves of the cornea in image formation, has the effect of yielding measurements which are an approximate average for the meridians measured.

Although in the description so far I have shown the targets to be two separate targets, there may in fact be only one large concave spherical bowl-shaped target which is masked first to yield a small circularly outlined illuminated area serving for the measurement of the apical radius of curvature of the cornea, and then masked to yield a large circularly outlined illuminated area to serve as the second target, with the border of each of the areas representing the target points. In another form or embodiment of the apparatus of this invention, each target may be a separate circular illuminated area, either a continuous circle or a series of spots arrayed circularly. Although I have described that the targets be illuminated succesively in the outline of the procedure for using the method and apparatus of this invention, both targets may be illuminated simultaneously without affecting the results.

Regardless of the type of target, or whether one or both targets are illuminated at the same time, the principles outlined in the invention remain the same.

For the measurement of apical radius of curvature and eccentricity of contact lenses the procedure is the same as outlined for the measurement of the cornea. For the measurement of convex conicoid surfaces, the apical radius of curvature determined by the image size, and the size of the image of the large target, have the same relationship as they do for the measurement of the cornea. For the concave conicoids of revolution, the images of the two targets are both slightly smaller than those for the convex surfaces of the same apical radius of curvature and eccentricity. Consequently the data provided in tabular form, or graphically, for the concave surface is slightly different than that provided for the convex surface.

For the purposes of this invention, the targets 27 and 29 need not lie in different planes as indicated in FIG. 4, but this arrangement was selected as a more convenient form of apparatus, and as a means of simplifying the calculations.

Wherever in the specification and claims I have referred to measuring the size of an image on the reticle of the telescope, I intend to include the use of supplementary adjustable doubling systems in the telescope for measuring image size, such equivalents being well known in the art.

I claim:

1. The method of determining the apical radius of curvature, r, and the eccentricity, e, of [a] *an optical* conicoid surface and [or in each of the principal meridians] of a reflecting surface such as a cornea whose principal sections are conics *in each of the principal meridians,* by observing through a telescope having a reticle with two lines crossing at 90 degrees on the optical axis of said telescope, [at least one of said cross lines calibrated and marked for image size measurement,] two images of two distinct circular targets as represented by at least two distinct points *for each of said targets* at opposite ends of [a diameter] *diameters* thereof along a principal meridian of the cornea reflecting said [image] *images,* one of said targets relatively small and the other relatively large, and one of said images relatively small and the other relatively large, comprising the steps of (1) supporting said two circular targets concentric to the optical axis of said telescope and normal to said axis; (2) observing through said telescope and manually focusing upon the image of the smaller of said two targets formed by said reflecting *surface* [surfaces]; (3) adjusting the position of said reflecting surface so that its optical axis is alined with the optical axis of said telescope whereby the image of said small circular target is centered upon the crossing point of said reticle; (4) when the small image is generally elliptical, as in the case of apical astigmatism of the reflecting surface, rotating said telescope about its optical axis so that the cross lines of said reticle coincide in a direction with the major and minor axes of the generally elliptical relatively small image; (5) manually sharply focusing upon and measuring the size of said image [on said reticle] for each of the two principal meridians [and relating said sizes to the apical radii of curvature for each of said meridians of said surface]; (6) when the small image is circular, as in the case where there is no apical astigmatism of the reflecting surface, manually sharply focusing *upon* and measuring the size of said image [on said reticle and relating said size to the apical radius of curvature of said surface]; (7) observing through said telescope and manually focusing upon the image of the larger of said two targets formed by said reflecting surface; (8) when the large image is generally elliptical, rotating said telescope about its optical axis so that the cross lines of said reticle coincide in a direction with the major and minor axes of said generally elliptical relatively large image; (9) manually sharply focusing upon and measuring the size of said image [on said reticle] for each of the said two principal directions; (10) when the large image is circular, measuring the size of said circular image [on said reticle; relating the apical radii of curvature of said surface and the image size of the large target for each of the two principal directions of said surface to the eccentricity of said surface in each of said two principal directions]; *(11) relating said small and large image sizes for each of said principal meridians to the apical radius of curvature and eccentricity in each of said principal meridians; and (12) when said small and large images are both circular, relating said small and large image sizes to the apical radius of curvature and eccentricity of said surface which is a conicoid.*

References Cited

The following references, cited by the Examiner, are of record in the patented file of this patent or the original patent.

UNITED STATES PATENTS

| | | | |
|---|---|---|---|
| 1,918,540 | 7/1933 | Hartinger | 351—13 |
| 2,482,669 | 9/1949 | Harding | 351—23 |
| 3,248,162 | 4/1966 | Knoll | 351—13 X |
| 3,264,932 | 8/1966 | Hendricks | 351—40 X |

FOREIGN PATENTS

| | | | |
|---|---|---|---|
| 11,409 | 3/1906 | Great Britain | 351—6 |

OTHER REFERENCES

Henry A. Knoll: "Corneal Contours—Revealed by the Photokeratoscope," Amer. J. Optom. & Archives of Amer. Acad. Optom., pp. 389–397, vol. 38, July 7, 1961.

DAVID SCHONBERG, Primary Examiner

P. A. SACHER, Assistant Examiner

U.S. Cl. X.R.

351—6, 13, 16, 40